(12) United States Patent
Lang

(10) Patent No.: US 8,776,549 B2
(45) Date of Patent: Jul. 15, 2014

(54) DEVICE AND METHOD FOR SEVERING A CONTINUOUS GLASS STRIP

(75) Inventor: Edwin Lang, Rain (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 630 days.

(21) Appl. No.: 12/677,188

(22) PCT Filed: Sep. 3, 2008

(86) PCT No.: PCT/DE2008/001469
§ 371 (c)(1),
(2), (4) Date: Mar. 9, 2010

(87) PCT Pub. No.: WO2009/033455
PCT Pub. Date: Mar. 19, 2009

(65) Prior Publication Data
US 2010/0162758 A1     Jul. 1, 2010

(30) Foreign Application Priority Data

Sep. 13, 2007    (DE) .......................... 10 2007 043 567

(51) Int. Cl.
    *C03B 33/023*       (2006.01)
    *C03B 33/02*        (2006.01)
    *C03B 17/06*        (2006.01)
    *B23D 33/02*        (2006.01)

(52) U.S. Cl.
    CPC ............... *C03B 33/023* (2013.01); *C03B 33/02* (2013.01); *C03B 17/06* (2013.01); *B23D 33/025* (2013.01)
    USPC ......... 65/97; 83/109; 83/157; 83/879; 65/174

(58) Field of Classification Search
    USPC .............. 65/29.12, 93, 97–98, 163, 165, 167, 65/174, 176; 83/109, 155–162
See application file for complete search history.

(56) References Cited

U.S. PATENT DOCUMENTS 1,785,496 A * 12/1930 Rowley ........................... 33/32.4
1,861,665 A * 6/1932 Owen ............................. 198/782

(Continued)

FOREIGN PATENT DOCUMENTS

BE          392056        11/1932
BE          392056        12/1932

(Continued)

OTHER PUBLICATIONS

DE3927731 machine translation as provided by http://translationportal.epo.org/emtp/translate/?ACTION=description-retrieval&COUNTRY=DE&FORMAT=docdb&KIND=A1&LOCALE=en_GB&NUMBER=3927731&OPS=ops.epo.org&TRGLANG=en&ENGINE=google&SRCLANG=de on Feb. 22, 2012.*

*Primary Examiner* — Jodi C Franklin
(74) *Attorney, Agent, or Firm* — Duane Morris LLP; J. Rodman Steele, Jr.; Gregory M. Lefkowitz

(57) ABSTRACT

The invention relates to a method and a device for severing a marked region of a glass strip (1) produced continuously on a conveyor belt (11), having the following characteristics: a) a line (12) highlighting the severing of the marked region is scored on the continuous glass strip (1), b) once the scored line (12) reaches the crusher roll (6), the two lock rolls (7, 8) following the crusher roll (6) are folded away downward, c) once the scored line (12) is located in the region of the highest area of the crusher roll (6), means for shearing off (5) push onto the glass strip (1) and break it off, d) after the broken-off glass piece (10) has dropped, the lock rolls (7, 8, 9) are folded back in the conveyor belt (11), and to a computer program and a machine-readable carrier with the program code thereof.

18 Claims, 5 Drawing Sheets

(56) References Cited

U.S. PATENT DOCUMENTS

| | | | | |
|---|---|---|---|---|
| 3,141,592 A | * | 7/1964 | Swann et al. | 225/98 |
| 3,517,869 A | * | 6/1970 | Dryon | 225/2 |
| 3,932,726 A | * | 1/1976 | Verheyen et al. | 219/121.67 |
| 4,076,159 A | * | 2/1978 | Farragher | 225/3 |
| 4,088,255 A | * | 5/1978 | DeTorre | 225/98 |
| 4,306,672 A | * | 12/1981 | Johannes | 225/97 |
| 4,475,937 A | * | 10/1984 | Nitschke | 65/163 |
| 4,698,088 A | * | 10/1987 | Bando | 65/174 |
| 5,104,523 A | * | 4/1992 | Masaharu et al. | 209/585 |
| 7,080,766 B2 | * | 7/2006 | McEntee et al. | 225/96.5 |
| 2004/0000045 A1 | * | 1/2004 | McEntee et al. | 29/413 |
| 2004/0188485 A1 | | 9/2004 | Lisec | |

FOREIGN PATENT DOCUMENTS

| | | | | |
|---|---|---|---|---|
| DE | 3927731 | A1 * | 2/1991 | C03B 33/02 |
| DE | 10 2004 025329 | | 12/2005 | |
| DE | 102004025329 | A1 | 12/2005 | |
| DE | 102007043567 | B3 | 10/2008 | |
| EP | 1475356 | A1 | 11/2004 | |
| FR | 2530612 | | 1/1984 | |
| FR | 2530612 | A1 | 1/1984 | |
| GB | 970550 | | 9/1964 | |
| GB | 1002485 | | 8/1965 | |
| SU | 975607 | | 11/1982 | |
| SU | 975607 | A1 | 11/1982 | |
| SU | 1384547 | A1 | 3/1988 | |
| SU | 1451109 | A1 | 1/1989 | |
| SU | 1520024 | A1 | 11/1989 | |
| WO | 2007051582 | A1 | 5/2007 | |
| WO | WO 2007/051582 | | 5/2007 | |

* cited by examiner

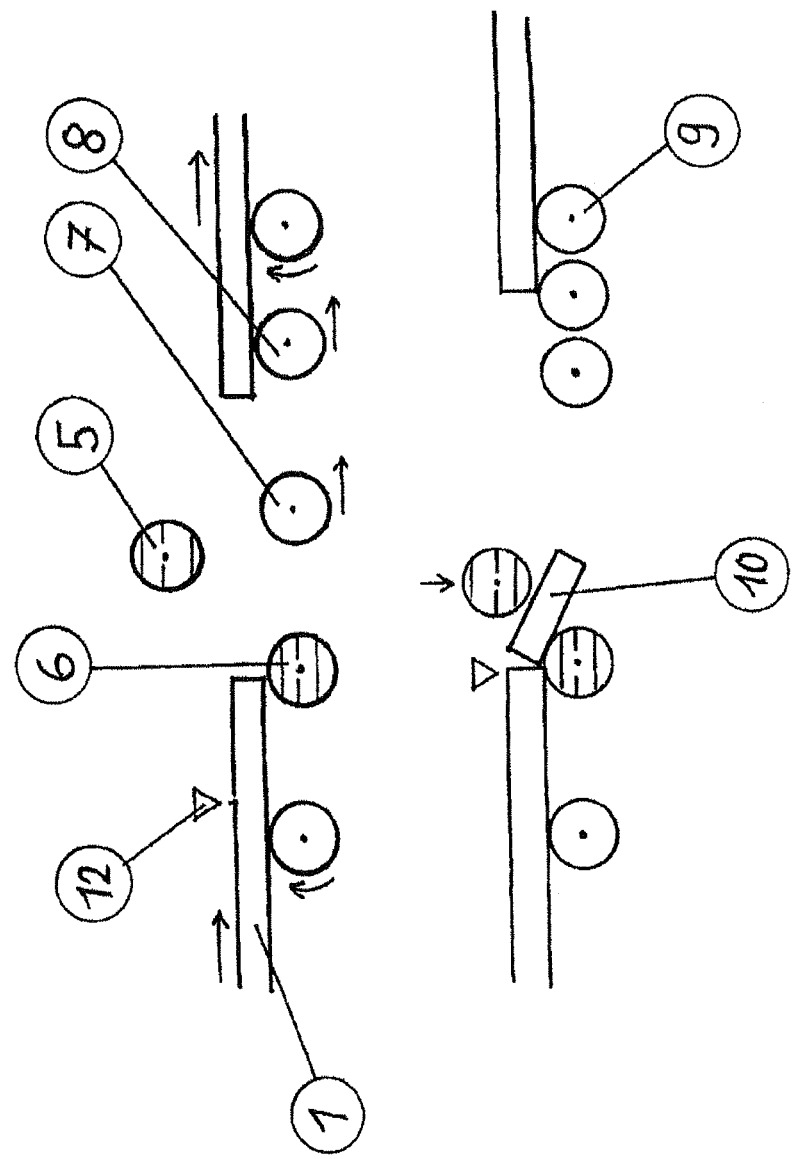

DEVICE AND METHOD FOR SEVERING A CONTINUOUS GLASS STRIP

CROSS-REFERENCE TO RELATED APPLICATIONS

This application is a §371 national stage entry of International Application No. PCT/DE2008/001469, filed Sep. 3, 2008, which claims priority to German Patent Application No. 10 2007 043 567.5, filed Sep. 13, 2007, both of which are hereby incorporated by reference.

BACKGROUND

Float glass is produced by continuously pouring out the glass melt on a tin bath, which is heated in an elongate tank, and the resulting glass ribbon.

Float glass is then finished by the longitudinal cutting and cross-cutting of the glass ribbon which emerges from the float glass production process at a defined feed rate. Here, the longitudinal cutting is carried out by longitudinal-cutting wheels which are installed in stationary fashion in an appropriate position above the glass ribbon, and the cross-cutting is carried out with the aid of cutting bridges and cross-cutting wheels which move thereon transversely above the glass ribbon.

Although it is technically conceivable to completely avoid particle inclusions or impurities in the glass when producing glass panes in the float glass process, this is scarcely possible using economically acceptable measures. This is why it is not surprising that the glass is accompanied by impurities, for example in flat glasses, and inclusions are present in the glass matrix. Among these inclusions, it is necessary to emphasize, in particular, nickel sulfide inclusions and inclusions of refractory materials, which generally make up the largest proportion of these impurities and can often be present with a size of up to about 600 micrometers.

Inclusions or particles of nickel sulfides or refractory materials in the submillimeter range are not perceived by the human eye and therefore do not influence the esthetic appearance of glass panes or similar products. However, inclusions such as these represent foreign bodies which have different material properties to glass and, under certain circumstances, for example after a hardening process, may therefore lead to spontaneous breaking of the glass. Such spontaneous breaking, as is observed, inter alia, in the case of facade claddings, may entail considerable personal injury and material damage. It is therefore necessary to try to use suitable methods to obtain information about possible inclusions, even before further use, in order to be able to separate out corresponding glass proportions in good time.

Optical investigation methods have already been proposed for the detection of inclusions in flat glass; these substantially involve the scattering of laser light in the amorphous glass and the analysis of the scattered light. Although this generally makes it possible to detect inclusions in a very reliable way, it is disadvantageous that this method always uses laser light and therefore results in a relatively large outlay on apparatus. In addition, the usable cross section of a laser beam is limited and, in view of the large glass surface areas to be investigated, this therefore calls for either a plurality of lasers to be used or for an increased amount of time as a result of the selective investigation of relatively small surface areas.

Therefore, the object of the method known from WO 2007/051582 A1 is to detect particles in a glass object in a simple manner and without an external light source.

The method described in said document substantially involves electromagnetic radiation which is emitted from the glass object during the solidification of the liquid glass at ambient temperature being recorded in a locally resolving manner, and the location-dependent detection of the radiation which is determined in this way being evaluated in order to determine inclusions (cf. claim 1).

For this purpose, the glass object is moved uniformly and the emitted radiation is recorded using one or more line detectors or area detectors, such as a CCD camera or a CMOS camera. Here, the exposure time of an area detector is adapted to the speed at which the object moves (cf. claim 4).

The inclusions which are discovered then have to be identified and cut out. For reasons which are apparent, this process should produce the least possible waste and take place quickly, without disrupting the ongoing production process.

In the production of auto glass, which is known from DE 10 2004 025 329 A1, for example, a considerable amount of waste is accrued if the trapezoidal vehicle windscreens are cut out from the prepared rectangular blanks.

In order to reduce the waste, the cutting pattern should substantially be selected in such a way that in each case two glass plates which are oriented so as to be rotated by 180° in relation to one another and have a corresponding inclined edge are arranged in the form of a strip transversely above the float glass ribbon such that they butt directly against each other and are aligned with one another with their parallel trapezium edges, and successive strips of pairs of glass plates directly adjoin each other in the direction of the float glass ribbon. In this case, the inclined trapezium edges should be cut by means of longitudinal-cutting elements and the parallel trapezium edges should be cut by means of cross-cutting elements (cf. in this respect claim 1).

DE 10 2004 025 329 A1 does not disclose how the glass proportions, which are cut away by the cutting elements and represent waste, are severed from the useful areas.

EP 1 475 356 B1 discloses a method for separating glass panels into glass blanks according to a predefined division pattern, in which method glass panels are separated into glass panel blanks in at least one first separation step in one direction (X cuts), and these glass panel blanks are then separated into glass blanks in at least one second separation step in a direction perpendicular to the first separation step (Y cuts).

This document intends to claim that the glass panel blanks which are obtained after the separation in the X direction on the table provided downstream of the first separation site (A) are jointly supplied to a second separation site (B), at which the glass panel blanks are separated along the Y cuts.

This document does not refer to the actual cutting-to-size and severing process.

In addition, there are devices for severing a glass ribbon which have rollers which can each be moved from their position in the roller table.

These are known from U.S. Pat. No. 1,861,665 A, cf. claim 1 and FIG. 4, from BE 392 056 A, cf. FIGS. 10 to 12 and claims 7 to 9, and from FR 2 530 612 A1, cf. FIG. 1 and claims 7 and 8.

SUMMARY OF THE INVENTION

Therefore, the object of the present invention is to provide a device and a method for the quick and reliable severing and removal of designated glass plates, which can be used in a continuous production process with a minimal amount of waste.

This object is achieved by a device as claimed in one of claims 1 to 4 and by a method as claimed in one of claims 12 to 15.

BRIEF DESCRIPTION OF THE DRAWINGS

The severing device according to the invention is described in more detail below. In detail:
FIG. 5: shows a fourth variant of the severing process.

DETAILED DESCRIPTION

Figure 1:
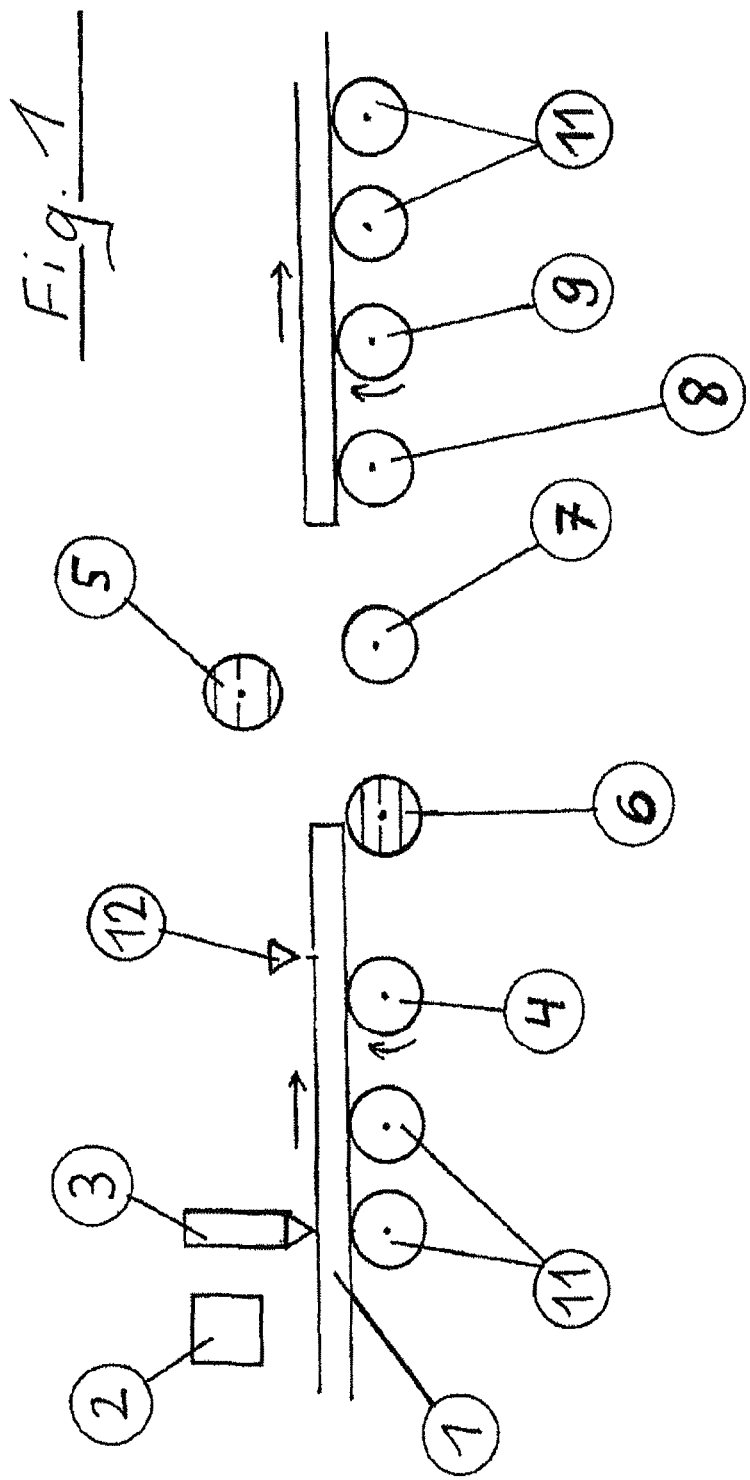
FIG. 1: shows an illustration in cross section.

FIG. 1 shows a cross section of the essential parts of the system.

In FIG. 1, (1) denotes the cooled glass ribbon which is guided over traveling rollers from the left-hand side. In this figure, the traveling roller (4) represents a series of traveling rollers which transport the glass ribbon along over the conveyor belt (11) at regular intervals.

In this illustration, the fault detector (2) represents a multiplicity of detectors and possible ways to detect those inclusions which are disruptive or can no longer be tolerated. In this case, a distinction is made, according to fault classes, regarding which and how many inclusions can still be tolerated, in each case depending on the quality or the specific requirements made on the relevant glass. If the test shows that specific regions of the glass ribbon (1) do not meet the requirements made, these regions are marked by the marking device (3). By way of example, such marking consists in scoring the boundary line of the relevant glass portion and using shearing-off means (5) to break off this part of the glass ribbon (1) at this boundary line, after the glass ribbon (1) has been transported along. In FIG. 1, such a marking (12) is denoted by a triangle, standing on a point, downstream of the traveling roller (4). It is possible to use a roller (5), as shown in FIG. 1, as means for shearing-off an undesired region in the moving glass ribbon. For this purpose, however, it is also possible to use any other sufficiently long compression-proof device.

The shearing-off roller (5) can go into action at the earliest when the corresponding, scored boundary line of the glass ribbon (1) is in the region of the highest point of the crusher roller (6), since only then is it possible for a bending moment to be applied to the glass ribbon (1) by the shearing-off roller (5) being placed on the latter, which leads to the breaking-off of the undesired glass strip (10) as waste.

Figure 2:
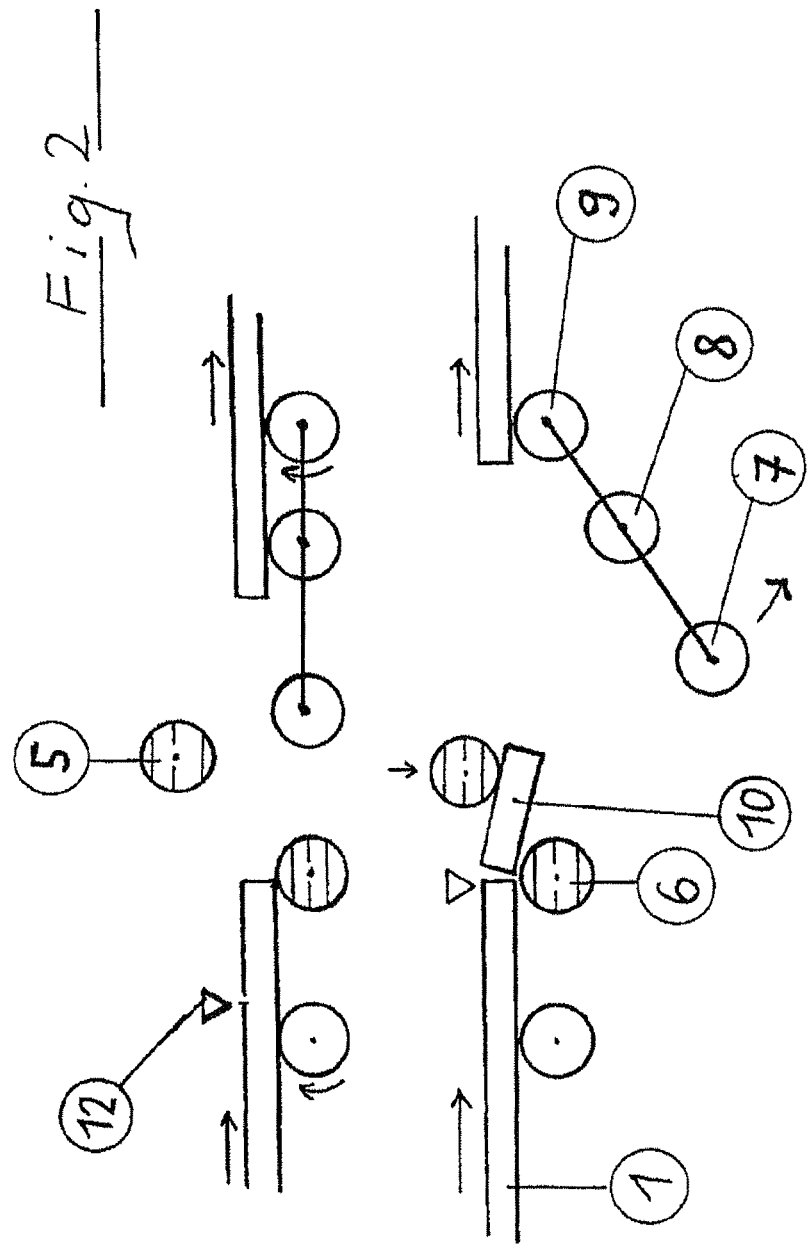
FIG. 2: shows a first variant of the severing process.

FIG. 2 shows a first variant of the further treatment, or of the quick removal, of the broken-off glass piece (10).

The further rollers of the conveyor belt (11), which conveys the entire glass ribbon, in the region where a glass piece (10) to be broken off is removed are denoted by a front lock roller (7) and a rear lock roller (8). The traveling roller (9) which follows these is again a normal section of the conveyor belt (11).

The line which is shown in FIG. 2, and connects the hinge pins of the front lock roller (7) and of the rear lock roller (8) to the hinge pin of the traveling roller (9), shows in sketched form that the hinge pins of the two lock rollers (7, 8) are mechanically connected to each other and can be mounted such that they can rotate about the hinge pin of the traveling roller (9).

As can be seen from the bottom part of FIG. 2, in this variant the lock rollers (7, 8) are folded away downward in order to clear the path for the glass piece (10), according to gravity. The traveling roller (9) may also be involved in this process.

After the glass piece (10) has been removed, the folded-away lock rollers (7, 8, or 9) are folded up and again form an integrated part of the conveyor belt (11).

The second variant (shown in FIG. 3) differs substantially from the first variant in that, although the lock rollers (7, 8) remain coupled to each other, they perform a completely different evasive movement than in the first variant.

Figure 3:
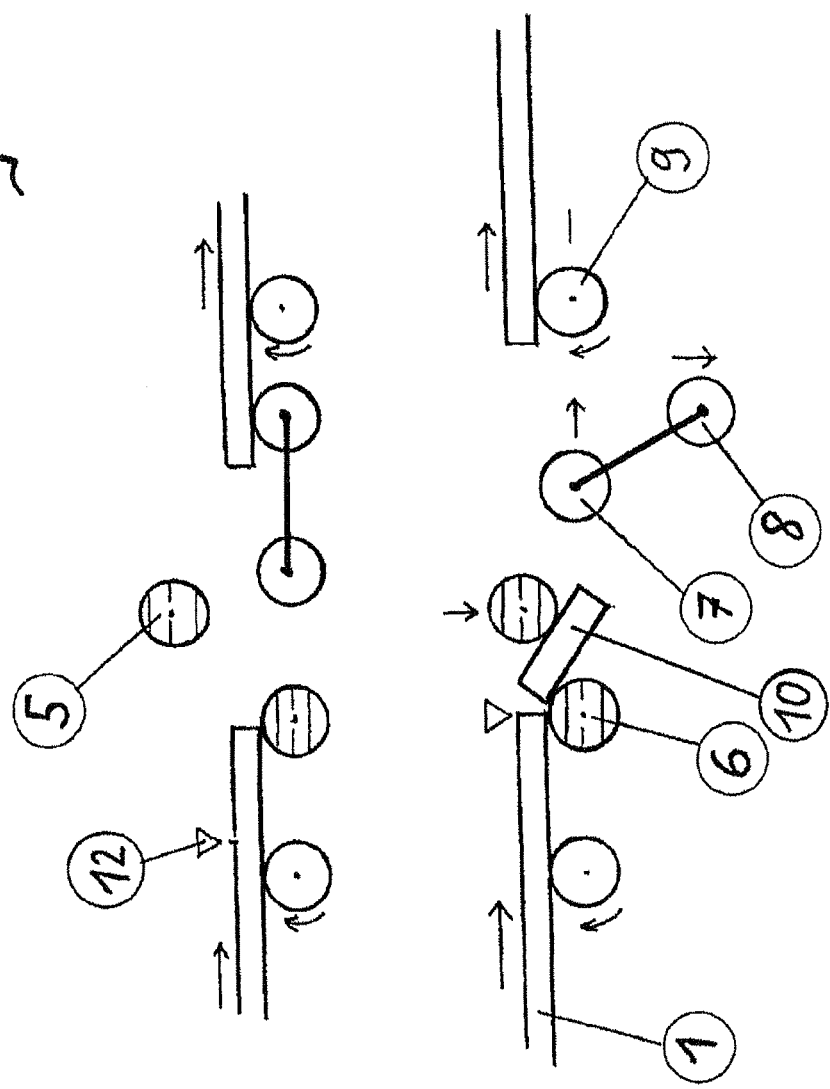
FIG. 3: shows a second variant of the severing process.

In the top part of FIG. 3, this can be seen merely from the fact that, although the hinge pins of the lock rollers (7, 8) are still connected, they are not mechanically connected to the traveling roller (9).

It can be seen from the bottom part of FIG. 3 that, for the process of removing the glass piece (10), the front lock roller (7) moves to the right and, at the same time, the rear lock roller (8) moves downward. Since the lock rollers are connected to each other, the effect of this process of the coupled evasive movement of the lock rollers (7, 8) is that overall the free space into which the glass piece (10) falls down can open up quicker and further.

Figure 4:
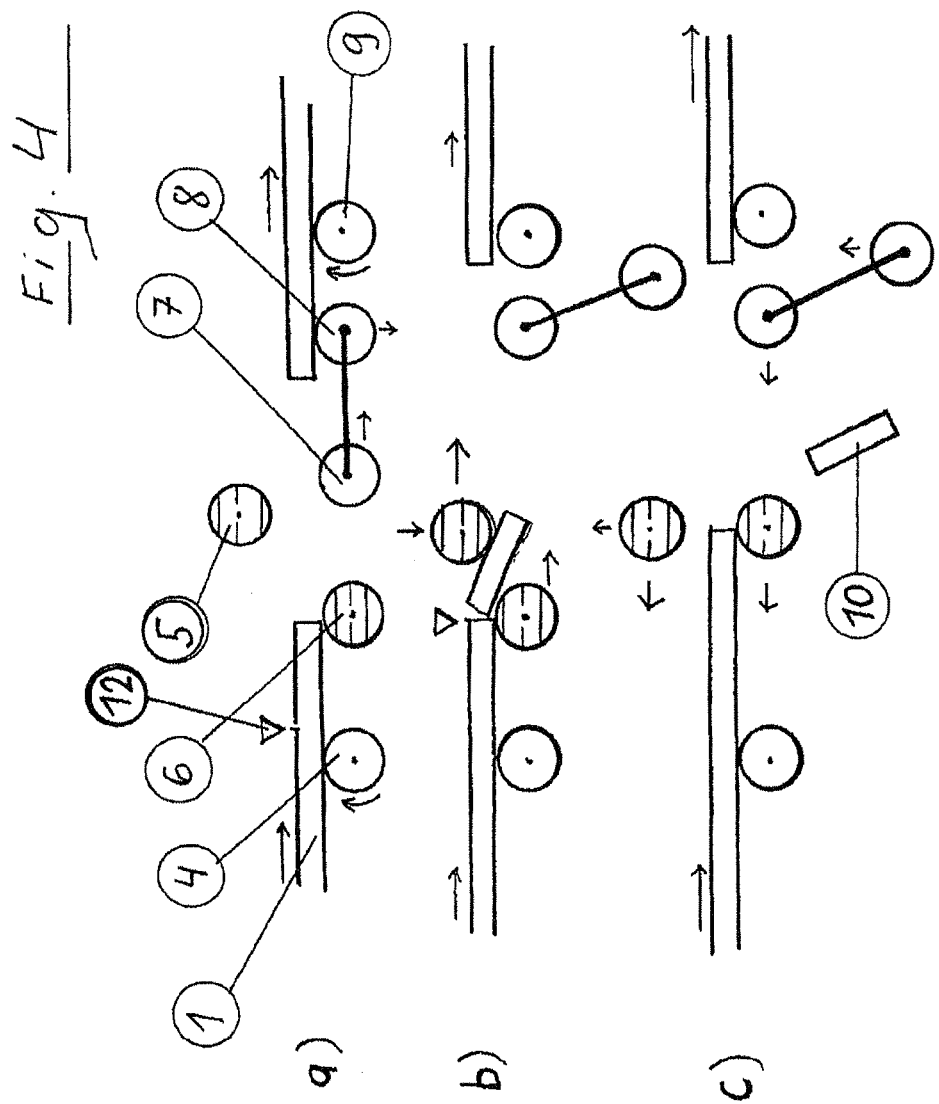
FIG. 4: shows a third variant of the severing process.

In the third variant (shown in FIG. 4), the lock rollers (7, 8) are again coupled mechanically to each other and move in a manner similar to that in the second variant, but this time the two lock rollers (7, 8) first move horizontally before the rear lock roller (8) then additionally moves downward.

As can be gathered from the succession of movement sequences in FIGS. 4a), 4b) and 4c), in the third variant the crusher roller (6) additionally moves together with the glass ribbon (1) running horizontally to the right at the same speed, and thus supports said glass ribbon in the entire region throughout the process for breaking off the glass piece (10). After the glass piece (10) is broken off, the crusher roller (6) moves back again into the initial position.

The fourth variant (shown in FIG. 5) describes a blind-like opening of the conveyor belt (11) for the purpose of severing and removing undesired parts of the glass ribbon (1).

A feature common to all of the variants described is that the shearing-off means can move together with the traveling glass ribbon (1), since otherwise the glass parts may become stuck in certain cases.

Likewise, a movement of the crusher roller which assists the breaking-off process is additionally provided. Depending on the specific conditions, this may consist in an additional movement of the crusher roller which takes place in addition to the movements described.

The choice of the method which is most favorable in each case depends both on the thickness of the glass ribbon (1), and therefore the speed of the glass ribbon (1), and on the type and the intended subsequent use of the glass produced.

All of the movement operations are detected by corresponding sensors, the output signals of which serve as the basis for calculating the activation times of the drive means of the rollers. It is preferable to use servomotors as the drive means.

If there are a plurality of marking lines (12), the respective distances between these marking lines are detected and are taken into account when controlling the relevant rollers (5, 6, 7, 8). Also, if a specific distance between the marking lines (12) is undershot, a further, additional roller supports the glass ribbon (1) from above in the region of the crusher roller (6), depending on the respective thickness of the glass ribbon (1).

The rollers (5, 6, 7, 8) involved in the process for severing and removing a glass piece (10), and also the additional roller, can also be inclined in order to sever inclined marking lines (12).

The system according to the invention also makes it possible to sever very short glass strips in quick succession.

LIST OF REFERENCE NUMERALS (1) Glass ribbon
(2) Fault detector for glass inclusions
(3) Marking device (scoring process)
(4) Traveling roller (crusher side)
(5) Shearing-off means (shearing-off roller)
(6) Crusher roller
(7) Front lock roller
(8) Rear lock roller
(9) Traveling roller (lock side)
(10) Broken-off glass piece (waste)
(11) Conveyor belt
(12) Marking line

The invention claimed is:

1. A device for severing a designated region of a glass ribbon (1) produced continuously on a conveyor belt (11), said device comprising:
   a marking device (3) for scoring a line (12) on the continuous glass ribbon which marks the severing location for the designated region of the glass ribbon (1);
   a crusher roller (6) positioned forward of the marking device;
   at least one moveable lock roller positioned forward of the crusher roller and moveable between a folded up position and a folded away position;
   a free space between the crusher roller and the at least one moveable lock roller wherein a part (10) can fall through the free space when the at least one moveable lock roller is in the folded away position;
   a shearing-off tool (5) positioned above the free space; and
   a control unit in operable communication with the shearing-off tool;
   wherein all positions are in relation to the running direction of the conveyor belt;
   wherein the control unit controls movement of the shearing-off tool between a starting position above a plane of the conveyor belt (11) at the crusher roller (6) and a lowered position at or below the plane to break off a part (10) of the glass ribbon (1) by pressing from above onto the part (10) that protrudes freely past the crusher roller when the scored line (12) is located in the region of the highest point of the crusher roller (6); and
   wherein the at least one moveable lock roller comprises a front lock roller (7) and a rear lock roller (8) and at least one of the front and rear lock rollers is moveable downward to the folded away position when the scored line (12) on the continuous glass ribbon reaches the crusher roller (6) and return to the folded up position after the glass piece (10) which is broken off has dropped through the free space.

2. The device as claimed in claim 1, wherein the shearing-off tool (5) comprises a moveable shearing-off tool, wherein the moveable shearing-off tool moves together with the glass ribbon during the shearing-off process.

3. The device as claimed in claim 1, wherein the crusher roller (6) further comprises a moveable crusher roller, wherein the moveable crusher roller performs an additional movement which assists the breaking-off process.

4. The device as claimed in claim 1, further comprising sensors, wherein information required for controlling movement operations is detected by the sensors and supplied to the control unit.

5. The device as claimed in claim 1, further comprising servomotors, wherein all movement operations are performed by the servomotors.

6. The device as claimed in claim 1, wherein, further comprising a line sensor and controlling unit, wherein the line sensor detects respective distances between a plurality of marking lines and supplies the respective distances to the controlling unit, and the controlling unit accounts for the respective distances when controlling the relevant rollers (5, 6, 7, 8).

7. The device as claimed in claim 1, further comprising a driver in operable communication with the control unit and operable connection with the shearing-off tool, wherein the driver causes movement of the shearing off tool between the starting position and the lowered position.

8. A device for severing a designated region of a glass ribbon (1) produced continuously on a conveyor belt (11), said device comprising:
   a marking device (3) for scoring a line (12) on the continuous glass ribbon which marks the severing location for the designated region of the glass ribbon (1);
   a crusher roller (6) positioned forward of the marking device;
   at least one moveable lock roller positioned forward of the crusher roller and moveable between a folded up position and a folded away position;
   a free space between the crusher roller and the at least one moveable lock roller wherein a part (10) can fall through the free space when the at least one moveable lock roller is in the folded away position;
   a shearing-off tool (5) positioned above the free space; and
   a control unit in operable communication with the shearing-off tool;
   wherein all positions are in relation to the running direction of the conveyor belt;
   wherein the control unit controls movement of the shearing-off tool between a starting position above a plane of the conveyor belt (11) at the crusher roller (6) and a lowered position at or below the plane to break off a part (10) of the glass ribbon (1) by pressing from above onto the part (10) that protrudes freely past the crusher roller when the scored line (12) is located in the region of the highest point of the crusher roller (6); and
   wherein the at least one moveable lock roller comprises a front lock roller (7) coupled to a rear lock roller (8) and the moveable lock roller is operable to simultaneously move the front lock roller (7) forward and the rear lock roller (8) downward into the folded away position when the scored line (12) on the continuous glass ribbon reaches the crusher roller (6)—and return the lock rollers to the folded up position after the glass piece (10) which is broken off has dropped through the free space.

9. A device for severing a designated region of a glass ribbon (1) produced continuously on a conveyor belt (11), said device comprising:
   a marking device (3) for scoring a line (12) on the continuous glass ribbon which marks the severing location for the designated region of the glass ribbon (1);
   a crusher roller (6) positioned forward of the marking device;
   at least one moveable lock roller positioned further forward than the crusher roller and moveable between a folded up position and a folded away position;

a free space between the crusher roller and the at least one moveable lock roller wherein a part (10) can fall through the free space when the at least one moveable lock roller is in the folded away position;

a shearing-off tool (5) positioned above the free space; and a control unit in operable communication with the shearing-off tool;

wherein all positions are in relation to the running direction of the conveyor belt;

wherein the control unit controls movement of the shearing-off tool between a starting position above a plane of the conveyor belt (11) at the crusher roller (6) and a lowered position at or below the plane to break off a part (10) of the glass ribbon (1) by pressing from above onto the part (10) that protrudes freely past the crusher roller when the scored line (12) is located in the region of the highest point of the crusher roller (6); and wherein the at least one moveable lock roller comprises a front lock roller (7) coupled to a rear lock roller (8) and the moveable lock roller is operable to sequentially move the rear lock roller (8) downward in accelerated fashion then move the front lock roller (7) forward into the folded away position when the scored line (12) on the continuous glass ribbon reaches the crusher roller (6) and return the two lock rollers to the folded up position after the glass piece (10) which is broken off has dropped through the free space.

10. A device for severing a designated region of a glass ribbon (1) produced continuously on a conveyor belt (11), said device comprising:

a marking device (3) for scoring a line (12) on the continuous glass ribbon which marks the severing location for the designated region of the glass ribbon (1)

a crusher roller (6) positioned forward of the marking device;

at least one moveable lock roller positioned further forward than the crusher roller and moveable between a folded up position and a folded away position;

a free space between the crusher roller and the at least one moveable lock roller wherein a part (10) can fall through the free space when the at least one moveable lock roller is in the folded away position;

a shearing-off tool (5) positioned above the free space; and a control unit in operable communication with the shearing-off tool;

wherein all positions are in relation to the running direction of the conveyor belt;

wherein the control unit controls movement of the shearing-off tool between a starting position above a plane of the conveyor belt (11) at the crusher roller (6) and a lowered position at or below the plane to break off a part (10) of the glass ribbon (1) by pressing from above onto the part (10) that protrudes freely past the crusher roller when the scored line (12) is located in the region of the highest point of the crusher roller (6); and wherein the at least one moveable lock roller comprises a front lock roller (7) coupled to a rear lock roller (8) and the front and rear lock rollers are moveable away from the crusher roller (6) in the running direction of the glass ribbon (1) into the folded away position when the scored line (12) on the continuous glass ribbon reaches the crusher roller (6) and return to the folded up position after the glass piece (10) which is broken off has dropped through the free space.

11. A method for severing a designated region of a glass ribbon (1) produced continuously on a conveyor belt (11), comprising:

a) scoring a line (12) on the continuous glass ribbon (1) which marks the severing location for the designated region of the glass ribbon (1);

b) when the scored line (12) on the continuous glass ribbon reaches the crusher roller (6), folding away downward at least one of the lock rollers (7, 8, 9) which follow the crusher roller (6) to form a free space between the crusher roller and the at least one moveable lock roller;

c) when the scored line (12) is located in the region of the highest point of the crusher roller (6), breaking off a part (10) of the glass ribbon (1) by moving a shearing-off tool (5) from a starting position above a plane of the conveyor belt (11) at the crusher roller (6) to a lowered position at or below the plane to press the shearing-off tool (5) from above onto the part (10) of the glass ribbon (1) which protrudes freely over the crusher roller (6); and d) after the glass piece (10) which is broken off has dropped through the free space, folding the lock rollers (7, 8, 9) back again into the conveyor belt (11).

12. The method as claimed in claim 11, further comprising performing an additional movement with the crusher roller (6) that assists the breaking-off process.

13. The method as claimed in claim 11, further comprising detecting information required for controlling the movement operations by sensors and supplying the information to a control unit.

14. The method as claimed in claim 11, further comprising performing all of the movement operations by servomotors.

15. The method as claimed in claim 11, further comprising detecting respective distances between a plurality of marking lines (12) and controlling the relevant rollers (5, 6, 7, 8) in response to the respective distances.

16. A method for severing a designated region of a glass ribbon (1) produced continuously on a conveyor belt (11) comprising:

a) scoring a line (12) on the continuous glass ribbon (1) which marks the severing location for the designated region of the glass ribbon (1);

b) when the scored line (12) on the continuous glass ribbon reaches the crusher roller (6), moving the front lock roller (7) which follows the crusher roller forward in the running direction of the glass ribbon (1) and, at the same time, moving the rear lock roller (8) which is connected in terms of function to said front lock roller (7) downward, to form a free space between the crusher roller and the at least one moveable lock roller;

c) when the scored line (12) overshoots the region of the highest point of the crusher roller (6), breaking off a part (10) of the glass ribbon (1) by moving a shearing-off tool (5) from a starting position above a plane of the conveyor belt (11) at the crusher roller (6) to a lowered position at or below the plane to press the shearing-off tool (5) from above onto the part (10) of the glass ribbon (1) that protrudes freely over the crusher roller (6); and d) after the glass piece (10) which is broken off has dropped through the free space, folding the two lock rollers (7, 8) back again into the conveyor belt (11).

17. A method for severing a designated region of a glass ribbon (1) produced continuously on a conveyor belt (11) comprising:

a) scoring a line (12) on the continuous glass ribbon (1) which marks the severing location for the designated region of the glass ribbon (1);

b) when the scored line (12) on the continuous glass ribbon reaches the crusher roller (6), first moving the rear lock roller (8) downward in accelerated fashion, and then pulling the front lock roller (7) away from the crusher roller (6) to form a free space between the crusher roller and the at least one moveable lock roller;

c) when the scored line (12) overshoots the region of the highest point of the crusher roller (6), breaking off a part (10) of the glass ribbon (1) by moving a shearing-off tool (5) from a starting position above a plane of the conveyor belt (11) at the crusher roller (6) to a lowered position at or below the plane to press the shearing-off tool (5) from above onto the part (10) of the glass ribbon (1) that protrudes freely over the crusher roller (6), after which the crusher roller (6) moves together with the glass ribbon; and d) after the glass piece (10) which is broken off has dropped through the free space, folding the two lock rollers (7, 8) are back again into the conveyor belt (11) and moving the crusher roller (6) back into its original position.

18. A method for severing a designated region of a glass ribbon (1) produced continuously on a conveyor belt (11) comprising:

a) scoring a line (12) on the continuous glass ribbon (1) which marks the severing location for the designated region of the glass ribbon (1);

b) when the scored line (12) on the continuous glass ribbon reaches the crusher roller (6), pulling the lock rollers (7, 8, 9) that follow the crusher roller (6) away from the crusher roller (6) in the running direction of the glass ribbon (1) to form a free space immediately forward and adjacent to the crusher roller;

c) when the scored line (12) overshoots the region of the highest point of the crusher roller (6), breaking off a part (10) of the glass ribbon (1) by moving a shearing-off tool (5) from a starting position above a plane of the conveyor belt (11) at the crusher roller (6) to a lowered position at or below the plane to press the shearing-off tool (5) from above onto the part (10) of the glass ribbon (1) that protrudes freely over the crusher roller (6), after which the crusher roller (6) moves together with the glass ribbon; and d) after the glass piece (10) which is broken off has dropped through the free space, pulling the lock rollers (7, 8, 9) back again into their original position in the conveyor belt (11).

\* \* \* \* \*